United States Patent
Obermuller

(10) Patent No.: US 9,788,522 B2
(45) Date of Patent: Oct. 17, 2017

(54) METHOD FOR MILKING SYSTEM AND MILKING SYSTEM

(71) Applicant: DELAVAL HOLDING AB, Tumba (SE)

(72) Inventor: Helmut Obermuller, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 182 days.

(21) Appl. No.: 14/758,580

(22) PCT Filed: Jan. 2, 2014

(86) PCT No.: PCT/SE2014/050002
§ 371 (c)(1),
(2) Date: Jun. 30, 2015

(87) PCT Pub. No.: WO2014/107134
PCT Pub. Date: Jul. 10, 2014

(65) Prior Publication Data
US 2015/0342140 A1    Dec. 3, 2015

Related U.S. Application Data

(60) Provisional application No. 61/749,433, filed on Jan. 7, 2013.

(30) Foreign Application Priority Data

Mar. 27, 2013  (SE) ...................................... 1350390

(51) Int. Cl.
*A01J 5/00* (2006.01)
*A01J 5/017* (2006.01)
*A01K 1/12* (2006.01)

(52) U.S. Cl.
CPC ............. *A01J 5/017* (2013.01); *A01J 5/0175* (2013.01); *A01K 1/126* (2013.01)

(58) Field of Classification Search
CPC ................................. A01J 5/017; A01J 5/0175
See application file for complete search history.

(56) References Cited

U.S. PATENT DOCUMENTS

| 5,909,716 A * | 6/1999 | van der Lely ........ A01J 5/0175 |
| | | 119/14.08 |
| 2009/0229527 A1 | 9/2009 | Mader et al. |

(Continued)

FOREIGN PATENT DOCUMENTS

| EP | 2 262 356 | 12/2010 |
| RU | 1777728 A1 | 11/1992 |

(Continued)

OTHER PUBLICATIONS

International-Type Search Report, dated Oct. 1, 2013, from corresponding PCT application.

(Continued)

*Primary Examiner* — Kristen C Hayes
(74) *Attorney, Agent, or Firm* — Young & Thompson

(57) ABSTRACT

A method is provided for a milking system including a moving device, milking stalls each provided with teat cups, an automatic teat cup attachment system, and an automatic teat cup returning system configured to return the teat cups to default storage positions subsequent to the milking. Current positions of the teat cups are, for each of the milking stalls, sensed after the teat cup returning system withdraws the teat cups, but before the automatic teat cup attachment system fetches the teat cups. The sensed positions of the teat cups are, for each of the milking stalls, compared with the default storage positions to determine whether the sensed current positions of the teat cups deviate from the default storage positions by at least a specified distance, and an (Continued)

action is performed when the sensed positions deviate from the default storage positions by at least the specified distance.

20 Claims, 2 Drawing Sheets

(56) References Cited

U.S. PATENT DOCUMENTS

| | | | | |
|---|---|---|---|---|
| 2010/0031889 | A1* | 2/2010 | Eriksson | A01K 1/126 |
| | | | | 119/14.02 |
| 2010/0058990 | A1 | 3/2010 | Danneker et al. | |
| 2011/0308469 | A1 | 12/2011 | Vollmer et al. | |
| 2012/0000427 | A1* | 1/2012 | Nilsson | A01J 5/017 |
| | | | | 119/14.02 |
| 2012/0103266 | A1 | 5/2012 | Nilsson | |
| 2014/0318459 | A1* | 10/2014 | Van Den Berg | A01J 5/0175 |
| | | | | 119/14.03 |

FOREIGN PATENT DOCUMENTS

| | | |
|---|---|---|
| RU | 2 244 417 C2 | 1/2005 |
| RU | 2009 112 383 A | 10/2010 |
| WO | 00/04764 A1 | 2/2000 |
| WO | 01/93668 A1 | 12/2001 |
| WO | 2009/093965 A1 | 7/2009 |
| WO | 2009/113884 A2 | 9/2009 |
| WO | 2010/112284 A1 | 10/2010 |
| WO | 2011/032902 A2 | 3/2011 |
| WO | 2011/086015 A1 | 7/2011 |
| WO | 2012/033448 A2 | 3/2012 |

OTHER PUBLICATIONS

International Search Report, dated Jun. 23, 2014, from corresponding PCT application.
Supplementary International Search Report, dated Apr. 10, 2015, from corresponding PCT application.

* cited by examiner

006
METHOD FOR MILKING SYSTEM AND MILKING SYSTEM

TECHNICAL FIELD OF THE INVENTION

The present invention relates generally to dairy farming. Particularly, the invention relates to a method for a milking system and a milking system.

BACKGROUND OF THE INVENTION

US 2011/0308469, US 2012/103266, WO 2009/093965, and US 2010/031889 disclose fully or semi automated rotary milking systems wherein automatic teat cup attachment can be performed by the use of a robot. Each of the milking stalls is provided with teat cups with separate milk tubes up to the vacuum/milk separation (i.e. no cluster is present). The teat cups of each milking stall are retracted to default storage positions subsequent to the milking of an animal therein. The robot fetches teat cups, one at a time, from a magazine of each milking stall and attaches them to the teats of an animal present in the milking stall. US 2012/298043 discloses a robot arm usable with the above milking systems.

WO 2011/086015 and WO 2012/033448 disclose teat cup magazines for storage of teat cups in default storage positions that are usable in the above milking systems. US 2010/058990 discloses another type of teat cup magazine.

EP 2262356 discloses another kind of rotary milking system wherein each milking stall comprises teat cups attached to a cluster, which in turn is connected to a single milk tube up to the vacuum/milk separation. A teat cup attachment robot serves each milking stall in order, wherein the cluster and the teat cups of the milking stall are fetched from default storage positions and are moved to the udder of an animal present in the milking stall, whereupon the teat cups are attached to the teats of the animal.

In each of these automated or semi-automated rotary milking systems, there will be situations when the teat cups (and optionally the cluster if present) are not positioned correctly (i.e. not in the default storage positions) and then the teat cup attachment arrangement (robot) may not be able to grip the teat cups. This may e.g. be caused by a cord attached to the cluster being broken or entangled with one of the teat cups, so that teat cup is not hanging down as it should. Alternatively, it may be caused by improper operation of the devices which are responsible for returning of the teat cups to the default storage positions, e.g. leading to the teat cups (and optionally the cluster if present) not being retracted correctly, i.e. sufficiently, so that the default storage positions are not reached.

Such problems will probably occur more often in rotary milking systems when a teat cup attachment arrangement (robot) serves a plurality of milking stalls and thus a plurality of default storage positions of the teat cups. Further, the milking stalls, and thus the default storage positions of the teat cups, are moving (rotating), which renders the automatic teat cup attachment procedure even harder.

Yet further, the rotary milking system has properties allowing actions to be performed which cannot be performed in stationary milking systems, such as batch wise milking systems, tied up milking systems, or fixed milking robot system installations.

WO 01/93668 discloses a detection device for a stationary milking system for milking an animal. The milking arrangement includes a milking device having at least one teat cup, which has a longitudinal axis and which is able to have a desired orientation (vertically arranged teat cup) and an undesired orientation (horizontally arranged teat cup lying on the floor after kick-off). The detection device includes at least one sensor, arranged to sense the value of a parameter related to said orientations of the teat cup, and a first communication unit for wireless transmission of said value to a second communication unit, which comprises a processor arranged to process said value in order to establish which of said orientations the teat cup has and which is arranged to perform an action if said teat cup has said undesired orientation. The action may be to pull the teat cup from the floor, to switch off the vacuum to the teat cup, and to activate an alarm.

The purpose of the detection in WO 01/93668 is to determine whether a teat cup has been kicked off or in some other way fallen to the floor. The detection device of WO 01/93668 detects orientations of the teat cups, and cannot distinguish between two vertical positions if the orientation of the teat cups is the same.

SUMMARY OF THE INVENTION

An object of this invention is to remedy or mitigate the problems disclosed above, and to increase the throughput and efficiency of a robot milking system.

In one aspect a method is provided for a milking system, such as e.g. a rotary milking system, which comprises a moving arrangement, such as e.g. a rotating platform; a plurality of milking stalls arranged thereon, each of which being provided with teat cups and provided for housing a milking animal during milking thereof; an automatic teat cup attachment arrangement provided, for each of the milking stalls, to fetch the teat cups of the milking stall at default storage positions and to attach the teat cups to the teats of a milking animal present in the milking stall prior to the milking thereof; and an automatic teat cup returning arrangement provided, for each of the milking stalls, to withdraw the teat cups of the milking stall with the purpose of returning them to the default storage positions subsequent to the milking of the milking animal present in the milking stall. The method comprises for each of the milking stalls, sensing the positions of the teat cups after the teat cup returning arrangement has withdrawn the teat cups of the milking stall after the milking of the milking animal present in the milking stall, but before the automatic teat cup attachment arrangement is to fetch the teat cups of the milking stall in connection with the milking of a following milking animal; comparing the sensed positions of the teat cups with the default storage positions of the teat cups; and performing an action with respect to the milking system if the sensed positions of the teat cups deviate from the default storage positions of the teat cups by at least a specified amount, wherein the action is performed before the automatic teat cup attachment arrangement is to fetch the teat cups of the milking stall in connection with the milking of the following milking animal. The default storage positions of the teat cups are the desired positions the teat cups should be in. Any deviations from such positions will make it more difficult to fetch the teat cups. An advantage of sensing this before the automatic teat cup attachment arrangement is to fetch the teat cups of the milking stall in connection with the milking of a following milking animal is that this gives the opportunity to place the teat cups in the default storage positions before they are to be fetched. Even if this turns out not to be possible, the system becomes more efficient by the attachment arrangement not spending any time trying to fetch teat cups which cannot be fetched, and if the sensing takes place early enough, animals can be blocked from entering a stall where fetching of teat cups is not possible. The default storage positions may also be referred to as desired storage positions, default idle positions, or desired idle positions.

The positions of the teat cups, which are sensed for each of the milking stalls, may be vertical positions only, or three-dimensional positions, of the teat cups.

The specified amount may be selected such that if the sensed positions of the teat cups deviate from the default storage positions of the teat cups by at least the specified amount, the automatic teat cup attachment arrangement will not be able to fetch the teat cups of the milking stall or will not be able to attach the teat cups to the teats of a milking animal. This will be an indication that the teat cups (and the cluster if present) are not positioned correctly, e.g. caused by the cord attached to the cluster (if present) being broken or entangled with one of the teat cups (causing that teat cup to not hang down as it should). Alternatively, the cluster or the teat cups (if separate milk tubes are present) have not been retraced correctly, e.g. sufficiently, due to some failure in the operation of the teat cup returning arrangement. As a result, the teat cups may be at positions slightly below the default storage positions, but oriented vertically such as in the default storage positions. The specified amount may be set by the system automatically, through the system in a learning phase storing data regarding teat cup positions during successful and failed fetching attempts and selecting a threshold accordingly. They may however also be set manually.

It is important that the sensing of the positions of the teat cups is made well in advance before the automatic teat cup attachment arrangement is to fetch the teat cups of the milking stall in connection with the milking of the following milking animal, such that there will be sufficient time to perform one or more actions before the automatic teat cup attachment arrangement is to fetch the teat cups of the milking stall in connection with the milking of the following milking animal.

In one embodiment, the action comprises one or more of the following: to automatically move the teat cups of the milking stall with the purpose of placing them in the default storage positions, to manually move the teat cups of the milking stall with the purpose of placing them in the default storage positions, optionally after having received an alarm, and to allow the teat cups to fall downwards by means of gravity, and then to retract the teat cups, with the purpose of moving them to the default storage positions.

To automatically move the teat cups of the milking stall with the purpose of placing them in the default storage positions may be performed in a number of manners involving use of the automatic teat cup attachment arrangement, the automatic teat cup returning arrangement, and/or any other device present in the milking system or introduced to the milking system for this purpose. If the milking system comprises a cluster, such as disclosed in EP 2262356, the steps of allowing the teat cups to fall downwards by means of gravity, and then retracting the teat cups, with the purpose of moving them to the default storage positions may be performed by controlling the automatic teat cup returning arrangement to simply let the cluster be moved or dropped out of the default storage position (wherein the teat cups are also moved or allowed to fall out of their default storage positions), after which the automatic teat cup returning arrangement again attempts to return the cluster and the teat cups to their default storage positions. This could in a system such as the one disclosed in EP 2262356 be performed by drawing the cluster back into position by means of pulling the cord attached to the cluster, which is part of the automatic teat cup returning arrangement.

In a further embodiment, the following steps may performed, for each of the milking stalls, subsequent to the above identified action(s): sensing a second time the positions of the teat cups before the automatic teat cup attachment arrangement is to fetch the teat cups of the milking stall in connection with the milking of the following milking animal, comparing the positions of the teat cups sensed the second time with the default storage positions, and performing a second action with respect to the milking system if the positions of the teat cups sensed the second time deviate from the default storage positions by at least the specified amount, wherein the second action may comprise (i) to alarm an operator and/or (ii) to not milk the following milking animal in the milking stall.

Additionally, the second action may comprise (iii) to halt the milking system or (iv) to fetch and move the teat cups of the milking stall by the teat cup attachment arrangement and to withdraw the teat cups of the milking stall with the purpose of returning them to the default storage positions by the teat cup returning arrangement without allowing any milking to be performed therein between.

The sooner after the teat cup returning arrangement has withdrawn the teat cups of the milking stall the positions of the teat cups are sensed, the more time is at hand for performing one or more of the above actions.

In one embodiment the positions of the teat cups are, for each of the milking stalls, sensed before the following milking animal, to the teats of which the automatic teat cup attachment arrangement is to attach the teat cups of the milking stall, is to enter the milking stall. Combined with any of the above embodiments, the action or the second action may comprise to not allow the following milking animal, to the teats of which the automatic teat cup attachment arrangement is to attach the teat cups of the milking stall, to enter the milking stall, e.g. by means of closing the milking stall. Thereby it can be prevented that an animal enters the milking stall if the teat cups cannot be attached and thus milking cannot take place.

In an alternative embodiment, the positions of the teat cups are sensed after the following milking animal has entered the milking stall.

In one embodiment, the positions of the teat cups may, for each of the milking stalls, be sensed by a single sensor, preferably a sensor that is not mounted on the moving arrangement, such as e.g. a camera, preferably a camera of an automatic post- or pre-milking teat treatment arrangement provided, for each of the milking stalls, to treat the teats of the milking animal present in the milking stall subsequent or prior to the milking thereof.

In an alternative embodiment, the positions of the teat cups may, for each of the milking stalls, be sensed by a separate sensor provided for that milking stall, preferably a sensor mounted on the moving arrangement and e.g. arranged to mechanically or electromagnetically interact with the teat cups.

In an embodiment, the sensor may, for each of the milking stalls, sense the default storage positions of the teat cups, preferably simultaneously as the positions of the teat cups are sensed. Alternatively, the default storage positions of the teat cups may, for each of the milking stalls, be stored and retrieved for the comparison.

In another aspect, a milking system is provided comprising a moving arrangement; a plurality of milking stalls arranged thereon, each of which being provided with teat cups and provided for housing a milking animal during milking thereof; an automatic teat cup attachment arrangement provided, for each of the milking stalls, to fetch the teat cups of the milking stall at default storage positions and to attach the teat cups to the teats of a milking animal present in the milking stall prior to the milking thereof; and an automatic teat cup returning arrangement provided, for each of the milking stalls, to withdraw the teat cups of the milking stall with the purpose of returning them to the default storage positions subsequent to the milking of the milking animal present in the milking stall. Further, the milking system may comprise a sensing arrangement arranged, for each of the milking stalls, to sense the positions of the teat cups after the teat cup returning arrangement has withdrawn the teat cups of the milking stall after the milking of the milking animal present in the milking stall, but before the automatic teat cup attachment arrangement is to fetch the teat cups of the milking stall in connection with the milking of a following milking animal; and a control arrangement arranged, for each of the milking stalls, to compare the sensed positions of the teat cups with the default storage positions of the teat cups; and if the sensed positions of the teat cups deviate from the default storage positions of the teat cups by at least a specified amount, to control the milking system to perform an action before the automatic teat cup attachment arrangement is to fetch the teat cups of the milking stall in connection with the milking of the following milking animal.

The various embodiments and alternatives disclosed with respect to the first aspect may also be applicable to the second aspect, i.e. the milking system.

Further characteristics of the invention and advantages thereof will be evident from the following detailed description of embodiments of the invention.

DETAILED DESCRIPTION OF THE DRAWINGS

DETAILED DESCRIPTION OF EMBODIMENTS

The documents cited in the background give examples of milking systems, and portions thereof, for which the present invention may be applied. All these documents, as well as references therein, are hereby incorporated by reference.

Figure 1:
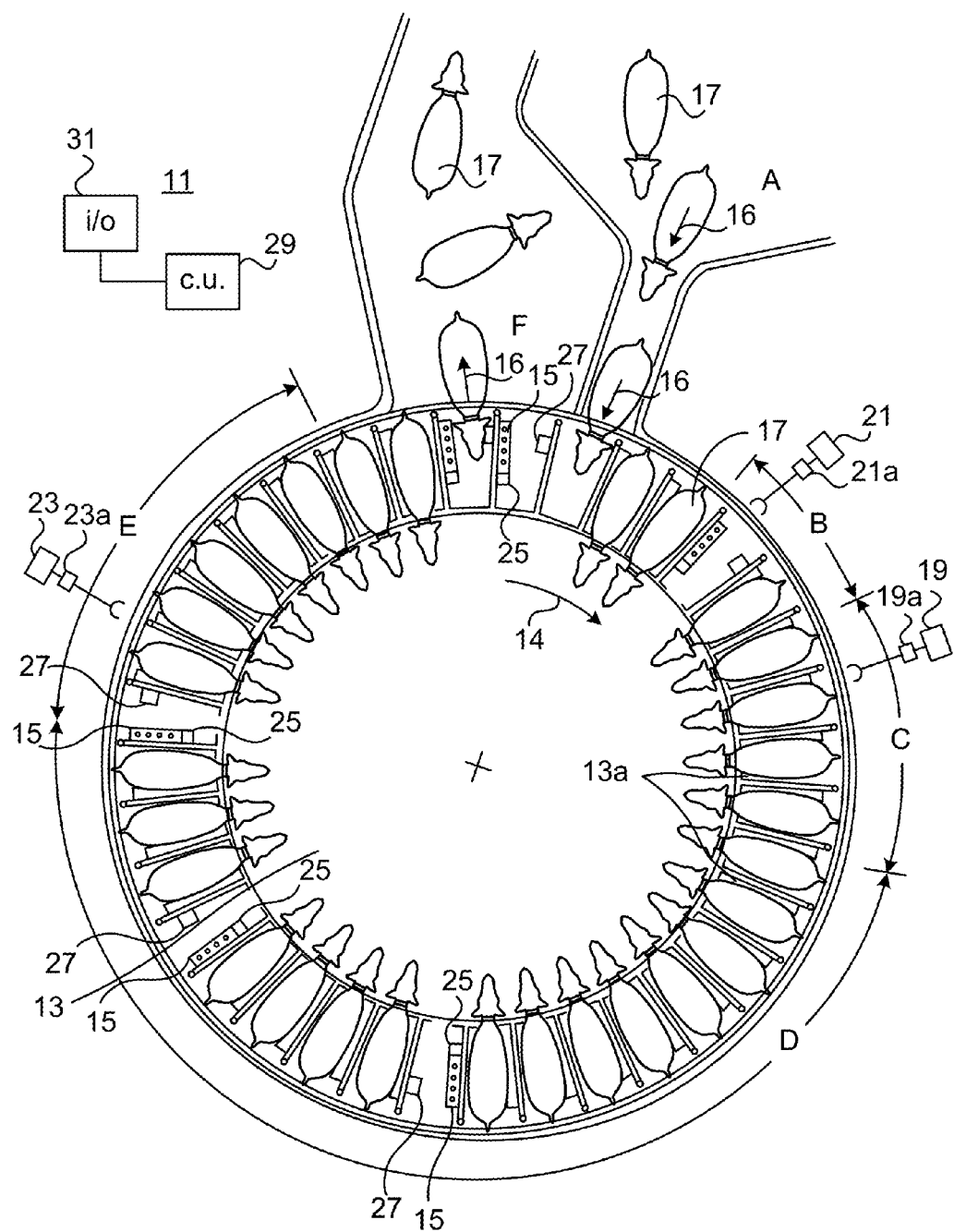
FIG. 1 is a schematic of a rotary milking system according to an embodiment of the invention.

FIG. 1 shows an automated or semi-automated rotary milking system 11 comprising a moving arrangement 13 in the form of a rotating platform, which rotates during milking. Alternatively, the moving arrangement 13 may be a linearly moving arrangement such as e.g. a conveyor belt. Such milking systems are known in the art.

A plurality of milking stalls 13a are arranged on the rotating platform 13, each of which being provided with milking equipment and being arranged to house a milking animal 17 during milking thereof, while the rotating platform 13 rotates. The milking equipment comprises teat cups 15 to be attached to the milking animal 17 prior to milking thereof.

Generally, the rotary milking system 11 is divided into six sections A-F, comprising an entrance section A wherein the milking animals 17 enter the milking stalls 13a in a serial order as the rotating platform rotates in accordance with arrow m; a pre-milking teat treatment section B wherein the teats of the milking animals 17 present in the milking stalls 13a are treated prior to the milking thereof; a teat cup attachment section C wherein teat cups 15 of the milking stalls 13a are attached to the milking animals 17 present in the milking stalls 13a; a milking section D wherein the main milking takes place; a post-milking teat treatment section E wherein the teats of the milking animals 17 present in the milking stalls 13a are treated subsequent to the milking thereof; and an exit section F wherein the milking animals 17 leave the milking stalls 13a and the rotating platform 13. The traffic of milking animals 17 in and out of the rotary milking system 11 is indicated by arrows 16. The pre- and post-milking teat treatment sections B, E may be optional and other sections may exist.

The pre-milking teat treatment section B may house an automatic pre-milking teat treatment arrangement 21, such as a robot equipped with a camera 21a and arranged to treat, e.g. clean and/or foremilk, the teats of the milking animals 17 present in the milking stalls 13a prior to the milking thereof. Alternatively, the pre-milking teat treatment may be performed manually or semi-manually.

The teat cup attachment section C comprises an automatic teat cup attachment arrangement 19, such as a robot equipped with a camera 19a and arranged to fetch the teat cups 17 of the milking stalls 13a at default storage positions and to attach the teat cups 17 to the teats of the milking animals 17 present in the milking stalls 13a prior to the milking thereof.

Upon completion of the milking of the milking animals 17 in the milking section D, the teat cups 15 of the milking stalls 13a are withdrawn with the purpose of returning them to the default storage positions. To this end, an automatic teat cup returning arrangement 25 is provided. The automatic teat cup returning arrangement 25 may be implemented as a plurality of teat cup returning devices or mechanisms, each being arranged in a respective one of the milking stalls 13a.

Such a teat cup returning device may comprise a cord connected in one end to a claw connected to the teat cups 15, if present, and a retracting mechanism connected to the other end of the cord and arranged to retract the claw and the teat cups back to the default storage position. Alternatively, if no claw is present the teat cups can be retracted to the default storage positions by means of a retracting mechanism operating on milk tubes connected to the teat cups. Other teat cup returning devices known in the art may be used.

The post-milking teat treatment section E may house an automatic post-milking teat treatment arrangement 23, such as a robot equipped with a camera 23a and arranged to treat, e.g. disinfect, the teats of the milking animals 17 present in the milking stalls 13a subsequent to the milking thereof. Alternatively, the post-milking teat treatment may be performed manually or semi-manually.

Further, the rotary milking system 11 comprises a control arrangement 29, which may be connected to an input and/or output device 31. The control arrangement 29 may be responsible for the control of the operation of the rotary milking system 11. To this end, various components of the rotary milking system 11 may be operatively connected to the control arrangement 29. It shall be appreciated that the control arrangement 29 may include one or more computers interconnected with one another.

Further, a sensing arrangement is provided, which may be implemented as a plurality of sensing devices 27, each being arranged in a respective one of the milking stalls 13a and operatively connected to the control arrangement. The sensing device 27 of each of the milking stalls 13a is arranged to sense the positions of the teat cups 15 in that milking stall 13a after the automatic teat cup returning arrangement 25 has returned (or intended to return) the teat cups 15 of that milking stall 13*a* to the default storage positions but before the automatic teat cup attachment arrangement 19 is to fetch the teat cups 15 of that milking stall 13*a* in order to attach them to a new milking animal 17; and to forward the sensed positions to the control arrangement 19.

The control arrangement 29 may be arranged, for each of the milking stalls 13*a*, to compare the sensed positions of the teat cups 15 with the default storage positions of the teat cups 15; and to control the rotary milking system 11 in response to that comparison. The default storage positions of the teat cups 15 may be determined in any manner and may be stored in the control arrangement 29 and retrieved when needed. Alternatively, the default storage positions of the teat cups 15 may be determined from measurements in real or near real time, e.g. by means of the sensing arrangement, preferably simultaneously as the positions of the teat cups are sensed, provided that the sensing arrangement has this capability. To this end, the default storage positions may be provided with marks or other properties that can be accurately sensed or measured.

The sensing devices 27, which may each be mounted on the rotating platform 13, may be any sensor known in the art for determining positions. In particular, the positions of the teat cups may be sensed by means of mechanically, optically, or electromagnetically interacting with the teat cups 15.

Alternatively, the sensing arrangement is a single sensor, e.g. a sensor that is not mounted on the rotating platform 13. An example of such a sensor is a camera. In different embodiments, the camera 21*a* of the automatic pre-milking teat treatment arrangement 21 or the camera 23*a* of the automatic post-milking teat treatment arrangement 23 may be used for sensing the positions of the teat cups 15 of each milking stall 13*a* before the automatic teat cup attachment arrangement 19 is to fetch the teat cups 15 of that milking stall 13*a*.

The control arrangement 29 may be arranged, for each of the milking stalls 13*a*, to perform the action with respect to the rotary milking system 11 if the sensed positions of the teat cups 15 deviate from the default storage positions of the teat cups 15 by a specified amount, preferably indicating that the automatic teat cup attachment arrangement 19 will not be able to fetch the teat cups 15 of the milking stall 13*a* or will not be able to attach the teat cups 15 to the teats of a milking animal 17 present in the milking stall 13*a*. The specified amount may be set by the system automatically, through the system in a learning phase storing data regarding teat cup positions during successful and failed fetching attempts and selecting a threshold accordingly. They may however also be set manually.

The action to be performed may include using the control arrangement 29, for each of the milking stalls 13*a*, to control the automatic teat cup attachment arrangement 19 to fetch and move the teat cups 15 of the milking stall 13*a* and to control the teat cup returning arrangement 25 to withdraw the teat cups 15 of the milking stall 13*a* with the purpose of returning them to the default storage positions without allowing any milking to be performed therein between.

Additionally, or alternatively, the action to be performed may include using the control arrangement 29, for each of the milking stalls 13*a*, to alert an operator via the input and/or output device 31 such that the operator can manually move the teat cups of the milking stall with the purpose of placing them in the default storage positions, to control the rotary milking system 11 to halt, to control the rotary milking system 11 to not milk a milking animal 17 in the milking stall 13*a*, and/or to control one or more devices to move the teat cups 15 of the milking stall 13*a* with the purpose of placing them in the default storage positions. Such devices may include the automatic teat cup returning arrangement 25, automatic pre-milking teat treatment arrangement 21, and the automatic post-milking teat treatment arrangement 23. The teat cup returning arrangement 25 may for instance allow the teat cups 15 to fall towards the floor by gravity and then retract the teat cups 15 again with the purpose of moving them to the default storage positions. If the teat cup returning arrangement 25 comprises, for each of the milking stalls 13*a*, a retracting mechanism operating on a cord holding a claw, to which the teat cups 15 are connected, the cord may be loosened to allow the claw to fall, and then suddenly retracted again to move the teat cups 15 with the purpose of placing them in the default storage positions. A similar operation may be performed by a retracting mechanism operating on milk tubes connected to the teat cups.

In one embodiment, the teat cups of the milking stall may firstly be moved in some manner with the purpose of placing them in the default storage positions, after which (i) the positions of the teat cups are sensed a second time before the automatic teat cup attachment arrangement is to fetch the teat cups of the milking stall in connection with the milking of the new milking animal; (ii) the positions of the teat cups sensed the second time are compared with the default storage positions; and (iii) a second action with respect to the milking system is performed if the positions of the teat cups sensed the second time deviate from the default storage positions by at least the specified amount. The second action may comprise to alarm an operator and/or to not milk the new milking animal in the milking stall. Additionally, the milking system may be halted or the teat cups of the milking stall may be fetched and moved by the teat cup attachment arrangement and may be withdrawn by the teat cup returning arrangement with the purpose of returning them to the default storage positions without allowing any milking to be performed therein between.

It shall be appreciated that, when the sensing arrangement is implemented as a plurality of sensing devices 27 in the milking stalls 13*a* or a single separate sensor, the positions of the teat cups 15 of each of the milking stalls 13*a* may be sensed before the milking animal 17, to the teats of which the automatic teat cup attachment arrangement 19 is to attach the teat cups of the milking stall 13*a*, is to enter the milking stall 13*a* in the entrance section A, or after the milking animal 17 has entered the milking stall 13*a* in the entrance section A, depending on whether the sensing is performed in sections E or F or in section B.

If the camera 21*a* of the automatic pre-milking teat treatment arrangement 21 is used as the sensing arrangement, the positions of the teat cups 15 of each of the milking stalls 13*a* can only be sensed after the milking animal 17, to the teats of which the automatic teat cup attachment arrangement 19 is to attach the teat cups of the milking stall 13*a*, has entered the milking stall 13*a* in the entrance section A; but if the camera 23*a* of the automatic post-milking teat treatment arrangement 23 is used as the sensing arrangement, the positions of the teat cups 15 of each of the milking stalls 13*a* are sensed before the milking animal 17, to the teats of which the automatic teat cup attachment arrangement 19 is to attach the teat cups of the milking stall 13*a*, is to enter the milking stall 13*a* in the entrance section A.

In the latter case, the action to be performed may include using the control arrangement 29, for each of the milking stations 13*a*, to close the milking stall 13*a* or to not allow the milking animal 17, to the teats of which the automatic teat cup attachment arrangement 19 is to attach the teat cups 15 of the milking stall 13a, to enter the milking stall 13a. Thereby it can be prevented that an animal enters the milking stall if the teat cups cannot be attached and thus milking cannot take place.

Figure 2:
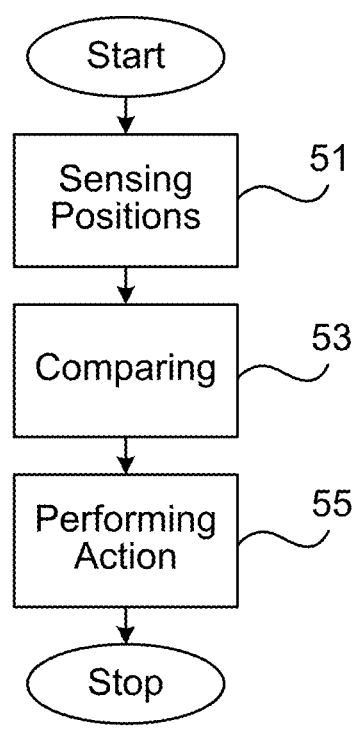
FIG. 2 is a flow scheme of a method according to an embodiment of the invention.

With reference next to FIG. 2, a method for a milking system is described, wherein the milking system comprises a moving arrangement; a plurality of milking stalls arranged thereon, each of which being provided with teat cups and provided for housing a milking animal during milking thereof; an automatic teat cup attachment arrangement provided, for each of the milking stalls, to fetch the teat cups of the milking stall at default storage positions and to attach the teat cups to the teats of a milking animal present in the milking stall prior to the milking thereof; and an automatic teat cup returning arrangement provided, for each of the milking stalls, to withdraw the teat cups of the milking stall with the purpose of returning them to the default storage positions subsequent to the milking of the milking animal present in the milking stall. An example of such a milking system is described with reference to FIG. 1. According to the method the following steps are performed for each of the milking stalls of the milking system. The positions of the teat cups are, in a step 51, sensed after the teat cup returning arrangement has withdrawn the teat cups of the milking stall after the milking of the milking animal present in the milking stall, but before the automatic teat cup attachment arrangement is to fetch the teat cups of the milking stall in connection with the milking of a new milking animal. The sensed positions of the teat cups are, in a step 53, compared with the default storage positions of the teat cups. Finally, an action with respect to the milking system is, in a step 55, performed if the sensed positions of the teat cups deviate from the default storage positions of the teat cups by at least a specified amount. The action is performed before the automatic teat cup attachment arrangement is to fetch the teat cups of the milking stall in connection with the milking of the new milking animal.

The sensing of the positions of the teat cups in step 51 may performed by the equipment and in the detailed manner disclosed with reference to FIG. 1. Similarly, the action to be performed with respect to the milking system 11 may include any of the actions disclosed with reference to FIG. 1, and may be performed if the sensed positions of the teat cups deviate from the default storage positions of the teat cups by a specified amount, e.g. indicating that the automatic teat cup attachment arrangement will not be able to fetch the teat cups of the milking stall or will not be able to attach the teat cups to the teats of a milking animal present in the milking stall.

The invention claimed is:

1. A method for a milking system (11) including a moving device (13), a plurality of milking stalls (13a) arranged on the moving device, an automatic teat cup attachment system (19) for each of the milking stalls, and an automatic teat cup returning system (25) for each of the milking stalls, each milking stall being provided with teat cups (15) and configured to house a milking animal (17) during milking thereof, the automatic teat cup attachment system fetching the teat cups of the milking stall at default storage positions and attaching the teat cups to teats of the milking animal present in the milking stall prior to the milking thereof, the automatic teat cup returning system withdrawing the teat cups of the milking stall to return the teat cups to the default storage positions subsequent to the milking of the milking animal present in the milking stall, the method comprising:

for each of the milking stalls, sensing current positions of the teat cups in the milking stall after the teat cup returning system withdraws the teat cups of the milking stall after the milking of the milking animal present in the milking stall, and before the automatic teat cup attachment system fetches the teat cups of the milking stall in connection with milking of a following milking animal;

for each of the milking stalls, comparing the sensed positions of the teat cups with the default storage positions of the teat cups to determine whether the sensed current positions of the teat cups deviate from the default storage positions of the teat cups by at least a specified distance; and for each of the milking stalls, performing a first action with respect to the milking system when the sensed current positions of the teat cups deviate from the default storage positions of the teat cups by at least the specified distance, the first action being performed before the automatic teat cup attachment system fetches the teat cups of the milking stall in connection with the milking of the following milking animal.

2. The method of claim 1, wherein the current positions of the teat cups, which are sensed for each of the milking stalls, are vertical positions of the teat cups, wherein the specified distance is a distance in the vertical direction with respect to the default storage positions.

3. The method of claim 1, further comprising sensing orientations of the teat cups for each of the milking stalls, the orientations of the teat cups being three-dimensional positions.

4. The method of claim 1, wherein, for each of the milking stalls, said first action comprises one or more of the following:

(i) automatically moving the teat cups of the milking stall to place the teat cups in the default storage positions;

(ii) receiving an alarm and manually moving the teat cups of the milking stall to place the teat cups in the default storage positions; and (iii) allowing the teat cups to fall downwards by gravity, and then retracting the teat cups to move the teat cups to the default storage positions.

5. The method of claim 4, wherein, for each of the milking stalls, the following steps are performed subsequent to performing said first action:

repeatedly sensing the positions of the teat cups before the automatic teat cup attachment system fetches the teat cups of the milking stall in connection with the milking of the following milking animal;

comparing the repeatedly-sensed positions of the teat cups with the default storage positions to determine whether or not the repeatedly-sensed positions of the teat cups deviate from the default storage positions of the teat cups by at least the specified distance; and performing a second action with respect to the milking system when the re-sensed positions of the teat cups deviate from the default storage positions by at least the specified distance, said second action comprising one or more of (i) causing an alarm to be output to alarm an operator, and (ii) waiting to milk the following milking animal in the milking stall.

6. The method of claim 5, wherein, for each of the milking stalls, said second action further comprises one or more of (iii) halting the milking system, and (iv) fetching and moving the teat cups of the milking stall by the teat cup attachment system and withdrawing the teat cups of the milking stall to return the teat cups to the default storage positions by the teat cup returning system without allowing any milking to be performed between the fetching and the withdrawing.

7. The method of claim 6, wherein, for each of the milking stalls, the positions of the teat cups are sensed by a camera (23a) of an automatic post-milking teat treatment system (23) treating, for each of the milking stalls, the teats of the milking animal present in the milking stall subsequent to the milking thereof.

8. The method of claim 5, wherein, for each of the milking stalls, the positions of the teat cups are sensed before the following milking animal, to which the automatic teat cup attachment system is configured to attach the teat cups to the teats thereof, enters the milking stall, and
said second action comprises closing the milking stall to prevent the following milking animal to enter the milking stall.

9. The method of claim 8, wherein, for each of the milking stalls, the positions of the teat cups are sensed by a single sensor (23a) that is not mounted on the moving device.

10. The method of claim 1, wherein, for each of the milking stalls, the positions of the teat cups are sensed before the following milking animal, to which the automatic teat cup attachment system is configured to attach the teat cups to the teats thereof, enters the milking stall.

11. The method of claim 10, wherein, for each of the milking stalls, said first action comprises one or more of closing the milking stall and not permitting the following milking animal to enter the milking stall.

12. The method of claim 1, wherein, for each of the milking stalls, the positions of the teat cups are sensed after the following milking animal, to which the automatic teat cup attachment system is configured to attach the teat cups to the teats thereof, enters the milking stall.

13. The method of claim 12, wherein, for each of the milking stalls, the positions of the teat cups are sensed by a single sensor (21a) that is not mounted on the moving device.

14. The method of claim 13, wherein, for each of the milking stalls, the positions of the teat cups are sensed by a camera (21a) of an automatic pre-milking teat treatment system (21) treating, for each of the milking stalls, the teats of the milking animal present in the milking stall prior to the milking thereof.

15. The method of claim 1, wherein, for each of the milking stalls, the positions of the teat cups are sensed by a sensor (27) provided for each of the respective milking stalls, the sensors disposed in each of the milking stalls being disposed on the moving device.

16. The method of claim 1, wherein the sensing step further comprises, for each of the milking stalls, sensing the default storage positions of the teat cups in addition to the sensing of the current positions of the teat cups.

17. The method of claim 16, wherein the default storage positions and the current positions of the teat cups are sensed simultaneously.

18. The method of claim 1, wherein, for each of the milking stalls, the default storage positions of the teat cups are stored and are retrieved for the comparing.

19. The method of claim 1, wherein, for each of the milking stalls, the specified distance is selected such that when the sensed current positions of the teat cups deviate from the default storage positions at least the specified distance, the automatic teat cup attachment system is unable to fetch the teat cups of the milking stall or is unable to attach the teat cups to the teats of the milking animal.

20. A milking system (11) comprising:
a moving device (13);
a plurality of milking stalls (13a) arranged on the moving device, each milking stall being provided with teat cups (15) and configured to house a milking animal (17) during milking thereof;
an automatic teat cup attachment system (19) for each of the milking stalls, the automatic teat cup attachment system fetching the teat cups of the milking stall at default storage positions and attaching the teat cups to teats of the milking animal present in the milking stall prior to the milking thereof;
an automatic teat cup returning system (25) for each of the milking stalls, the automatic teat cup returning system withdrawing the teat cups of the milking stall to return the teat cups to the default storage positions subsequent to the milking of the milking animal present in the milking stall;
a sensing system (23a; 21a; 27) sensing, for each of the milking stalls, current positions of the teat cups in the milking stall after the teat cup returning system withdraws the teat cups of the milking stall after the milking of the milking animal present in the milking stall, and before the automatic teat cup attachment system fetches the teat cups of the milking stall in connection with milking of a following milking animal; and
a controller (29) comparing, for each of the milking stalls, the sensed current positions of the teat cups with the default storage positions of the teat cups to determine whether the sensed current positions of the teat cups sensed by the sensing system deviate from the default storage positions of the teat cups by at least a specified distance, and controlling the milking system to perform a first action before the automatic teat cup attachment system fetches the teat cups of the milking stall in connection with the milking of the following milking animal, when the sensed positions of the teat cups deviate from the default storage positions of the teat cups by at least the specified distance.

* * * * *